(12) United States Patent
Takeuchi

(10) Patent No.: US 10,104,389 B2
(45) Date of Patent: Oct. 16, 2018

(54) APPARATUS, METHOD AND NON-TRANSITORY MEDIUM STORING PROGRAM FOR ENCODING MOVING PICTURE

(71) Applicant: FUJITSU LIMITED, Kawasaki-shi, Kanagawa (JP)

(72) Inventor: Kenshiro Takeuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 15/273,229

(22) Filed: Sep. 22, 2016

(65) Prior Publication Data

US 2017/0099494 A1    Apr. 6, 2017

(30) Foreign Application Priority Data

Oct. 5, 2015   (JP) .................................. 2015-197610

(51) Int. Cl.
| | |
|---|---|
| *H04N 19/50* | (2014.01) |
| *H04N 19/176* | (2014.01) |
| *H04N 19/51* | (2014.01) |

(Continued)

(52) U.S. Cl.
CPC ............ *H04N 19/50* (2014.11); *H04N 19/12* (2014.11); *H04N 19/154* (2014.11);
(Continued)

(58) Field of Classification Search
CPC .... H04N 19/12; H04N 19/124; H04N 19/154; H04N 19/176; H04N 19/50; H04N 19/51; H04N 19/91
See application file for complete search history.

(56) References Cited

U.S. PATENT DOCUMENTS

| | | | |
|---|---|---|---|
| 9,716,894 B2* | 7/2017 | Joshi ..................... | H04N 19/467 |
| 2005/0053136 A1* | 3/2005 | Yu ........................ | H04N 19/176 |
| | | | 375/240.16 |

(Continued)

FOREIGN PATENT DOCUMENTS

| | | |
|---|---|---|
| JP | 2014-176039 A | 9/2014 |
| JP | 2015-019140 A | 1/2015 |
| WO | 2014/104242 A1 | 7/2014 |

OTHER PUBLICATIONS

Heiko Schwarz et al., "R-D Optimized Multi-Layer Encoder Control for SVC", 2007 IEEE International Conference on Image Processing, II, pp. 281-284 (Total 4 pages).

*Primary Examiner* — Francis Geroleo
(74) *Attorney, Agent, or Firm* — Fujitsu Patent Center

(57) ABSTRACT

An apparatus for encoding a moving picture by an interlayer prediction coding determines, in a first encoding process for a first layer, whether the orthogonal transformation is applied to a first sub-block, based on a feature amount indicating a localization degree level of a pixel having a non-zero value in a prediction error signal. The apparatus generates, in the first encoding process, a local decoding picture by decoding the first sub-block based on a quantized coefficient obtained by quantizing either one of an orthogonal transformation coefficient or the prediction error signal, according to a result of the determining. The apparatus generates, in a second encoding process for a second layer, a second prediction block based in part on the local decoding picture. The apparatus applies the entropy encoding to a second prediction error signal between the second prediction block and a second block, to output an encoded bit stream.

11 Claims, 10 Drawing Sheets

(51) Int. Cl.
*H04N 19/12* (2014.01)
*H04N 19/154* (2014.01)
*H04N 19/124* (2014.01)
*H04N 19/91* (2014.01)

(52) U.S. Cl.
CPC ........... *H04N 19/176* (2014.11); *H04N 19/51* (2014.11); *H04N 19/124* (2014.11); *H04N 19/91* (2014.11)

(56) References Cited

U.S. PATENT DOCUMENTS

| | | | | |
|---|---|---|---|---|
| 2007/0047644 | A1* | 3/2007 | Lee | H04N 19/176 375/240.1 |
| 2008/0151999 | A1* | 6/2008 | Youn | H04N 19/176 375/240.03 |
| 2013/0016777 | A1* | 1/2013 | Gao | H04N 19/176 375/240.12 |
| 2013/0114730 | A1* | 5/2013 | Joshi | H04N 7/30 375/240.18 |
| 2013/0266235 | A1* | 10/2013 | Shima | G06T 9/004 382/238 |
| 2013/0343464 | A1* | 12/2013 | Van der Auwera | H04N 19/176 375/240.18 |
| 2014/0286413 | A1* | 9/2014 | Joshi | H04N 19/70 375/240.12 |
| 2014/0362917 | A1* | 12/2014 | Joshi | H04N 19/46 375/240.13 |
| 2015/0003512 | A1* | 1/2015 | Deng | H04N 19/187 375/240.02 |
| 2016/0014432 | A1* | 1/2016 | Park | H04N 19/82 375/240.16 |
| 2016/0100187 | A1* | 4/2016 | Lee | H04N 19/139 375/240.16 |
| 2016/0227244 | A1* | 8/2016 | Rosewarne | H04N 19/105 |
| 2016/0227253 | A1* | 8/2016 | Sato | H04N 19/159 |

\* cited by examiner

APPARATUS, METHOD AND NON-TRANSITORY MEDIUM STORING PROGRAM FOR ENCODING MOVING PICTURE

CROSS-REFERENCE TO RELATED APPLICATION

This application is based upon and claims the benefit of priority of the prior Japanese Patent Application No. 2015-197610, filed on Oct. 5, 2015, the entire contents of which are incorporated herein by reference.

FIELD

Present disclosure relates, for example, an apparatus, a method and a non-transitory medium storing a program for encoding a moving picture.

BACKGROUND

Moving picture data generally has a very large amount of data. Accordingly, an apparatus handling such moving picture data compresses the moving picture data by encoding the moving picture data when transmitting the moving picture data to another apparatus or storing the moving picture data in a storage device. As a typical encoding technique for moving pictures, moving picture experts group phase 2 (MPEG-2), MPEG-4, or H.264 MPEG-4 advanced video coding (H.264 MPEG-4 AVC) is widely used. In particular, high efficiency video coding (HEVC) standardized through an ISO/IEC and ITU-T joint project achieves compression efficiency almost twice as high as H.264/MPEG-4 AVC.

In addition, in H.264 or HEVC, an expansion method such as a scalable encoding is defined. The scalable encoding is an encoding method for hierarchically generating a plurality of encoding data items which have difference qualities with respect to the same moving picture data. Accordingly, with respect to the moving picture data encoded by the scalable encoding method, an apparatus for decoding a moving picture can reproduce the moving picture data having a desired quality by selecting encoding data in accordance with an application from the plurality of encoding data items and decoding the selected encoding data. The term "quality" as used here refers to a quality relating to at least one of a spatial resolution, a time resolution, and fidelity with respect to an original image. In addition, the term "hierarchic" indicates that the moving picture data having a lower quality is referred when the moving picture data having a higher quality is encoded. In general, correlation between the moving picture data items in each hierarchy is high. Accordingly, as compared to the encoding data amount when the moving picture data items in each hierarchy are independently, the encoding data amount when the moving picture data items in each hierarchy is subjected to the scalable encoding can be greatly reduced.

When applying the scalable encoding to the moving picture data, a technique for improving the encoding efficiency is proposed. For example, in the some related art, an encoding parameter in a basic hierarchy is determined based on rate distortion properties in the base hierarchy and rate distortion properties in an extension hierarchy.

As an example of the related art, Schwarz et al. (2007) "R-D OPTIMIZED MULTI-LAYER ENCODER CONTROL FOR SVC," 2007 IEEE International Conference on Image Processing, II-281-284, is known.

SUMMARY

According to an aspect of the invention, an apparatus for encoding a moving picture by an inter-layer prediction coding includes a memory and a processor coupled to the memory. The processor in the apparatus is configured to execute the following process. The apparatus generates, in a first encoding process for a first layer in the moving picture, a prediction block for a first block, the first block being a part of a picture included in moving picture data, both of the prediction block and the first block having one or more of pixels. The apparatus calculates, in the first encoding process, a prediction error signal between the prediction block and the first block. The apparatus calculates, in the first encoding process, a feature amount indicating a localization degree level of a pixel having a non-zero value in the prediction error signal, for a first sub-block which is a part of the first block and is used for a unit of orthogonal transformation. The apparatus determines, in the first encoding process, whether the orthogonal transformation is executed for the first sub-block in the first block, based at least in part on the feature amount. The apparatus generates, in the first encoding process, a first local decoding picture by decoding the first sub-block based at least in part on a quantized coefficient which is obtained by quantizing either one of an orthogonal transformation coefficient or the prediction error signal in accordance with a result of the determining, the orthogonal transformation coefficient being obtained by applying the orthogonal transformation to the prediction error signal. The apparatus performs, in the first encoding process, an entropy encoding of the quantized coefficient to output a first encoded bit stream. The apparatus generates, a second encoding process for a second layer other than the first layer in the moving picture, a second prediction block for a second block based at least in part on any of the first local decoding picture, the other picture encoded before the picture, and other block encoded before the second block, the second block being a part of the picture, the second block being a part of the picture included in moving picture data, both of the second prediction block and the second block having one or more of pixels. The apparatus performs, in the second encoding process, the entropy encoding of the prediction error signal between the second prediction block and the second block to output a second encoded bit stream.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
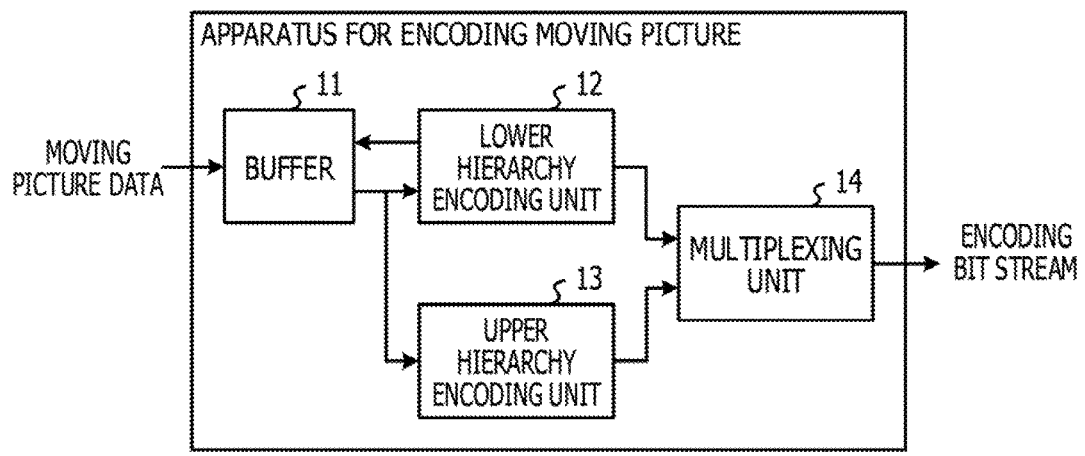
FIG. 1 is a schematic diagram illustrating an apparatus for encoding a moving picture according to a first embodiment.

In an encoding method such as H.264 or HEVC, in general, a picture included in moving picture data is divided into a plurality of blocks. Each block is, for example, encoded in raster scan order. In this case, when a focusing block is encoded, a prediction block is generated based on the other pictures encoded in advance or other blocks encoded in advance. A prediction error signal indicating an error between the corresponding pixels between the focusing block and the prediction block. Accordingly, the spatial or temporal redundancy is removed. An apparatus for encoding a moving picture encodes the prediction error signal of each block, thereby high compression efficiency is obtained.

When encoding the prediction error signal, the apparatus for encoding a moving picture calculates, for example, orthogonal transformation coefficient by orthogonal transforming the prediction error signal and quantizes the orthogonal transformation coefficient. The apparatus for encoding a moving picture performs entropy encoding of the quantized orthogonal transformation coefficient. In such encoding, since an error occurs due to the orthogonal transformation and quantization, the moving picture data which is obtained by decoding the moving picture data encoded once is not fully identical to original moving picture data. Therefore, information loss occurs. Such encoding is called lossy coding.

On the other hand, according to applications such as a medical application, it is demanded to encode the moving picture data such that the original moving picture data is completely reproduced by decoding the encoded moving picture data, that is, without information loss. For example, regarding a medical image captured by an inspection apparatus such as CT, there is a duty of pursuant. Therefore, the image is encoded without information loss. Such encoding is called lossless coding. As described above, since the information loss occurs due to the orthogonal transformation and the quantization, the apparatus for encoding a moving picture for lossless coding the moving picture data does not perform the orthogonal transformation and the quantization with respect to the prediction error signal of each block, and performs direct entropy encoding of the prediction error signal.

In this manner, in a case where the scalable encoding is applied to the moving picture data to be demanded for lossless coding, for example, the moving picture data in a lower hierarchy is subjected to the lossy coding and the moving picture data in an upper hierarchy is subjected to the lossless coding, in some cases. In such a case, by without performing the orthogonal transformation and the quantization in the upper hierarchy, increases in a prediction error, when inter-hierarchy prediction encoding is applied, due to the error by the orthogonal transformation and the quantization in the lower hierarchy is not suppressed. The encoding efficiency in the upper hierarchy is deteriorated. The same reason is also applied in a case where an encoding parameter in the lower hierarchy is determined by the related art disclosed in the above-described document. As a result, the encoding efficiency as the entire may not be optimized.

As one aspect of the present embodiment, provided are solutions for being able to improve the encoding efficiency when performing the lossy coding of the moving picture data in the lower hierarchy and performing the lossless coding in the upper hierarchy.

Hereinafter, the apparatus for encoding a moving picture by an inter-layer prediction coding will be described with reference to accompanying drawings.

The apparatus for encoding a moving picture performs scalable encoding of each picture included in the moving picture data to the lower hierarchy to which the lossy coding is applied and the upper hierarchy to which the lossless coding is applied. The apparatus for encoding a moving picture evaluates localization of the pixel having a non-zero value included in the prediction error signal for each block in which the picture included in the moving picture data is divided, for the lower hierarchy. The apparatus for encoding a moving picture skips the orthogonal transformation in the block having high localization. Accordingly, the apparatus for encoding a moving picture suppresses that the error caused due to the orthogonal transformation and the quantization is diffused to the entire local decoded block, in the block having high localization of the prediction error. Therefore, the deterioration of a correlation between the corresponding block in the upper hierarchy and the local decoded block. Accordingly, when the corresponding block in the upper hierarchy is subjected to the inter-hierarchy prediction encoding, the apparatus for encoding a moving picture suppresses that the number of the pixels having the non-zero value in the prediction error signal increase. Therefore, the apparatus for encoding a moving picture improves the encoding efficiency as a whole.

In the present embodiment, the apparatus for encoding a moving picture encodes the moving picture data follows the HEVC. The apparatus for encoding a moving picture may encode the moving picture data follows the other encoding standard to which the scalable encoding and Transform Skip (skip of the orthogonal transformation) are applicable.

In addition, the picture may be any of a frame and a field. The frame is one still image in the moving picture data items. On the other hand, the field is the still image obtained by extracting only data in an odd-numbered row or only data in an even-numbered row from the frame.

FIG. 1 is a schematic diagram illustrating an apparatus for encoding a moving picture according to a first embodiment. The apparatus for encoding a moving picture 1 includes a buffer 11, a lower hierarchy encoding unit 12, an upper hierarchy encoding unit 13, and a multiplexing unit 14.

Each unit included in the apparatus for encoding a moving picture 1 is formed as a separate circuit, respectively. Alternatively, these units included in the apparatus for encoding a moving picture 1 may be mounted at the apparatus for encoding a moving picture 1 as a single or a plurality of integrated circuits in which a circuit corresponding to each unit is integrated. Furthermore, each unit included in the apparatus for encoding a moving picture 1 may be a functional module which is realized by a computer program which is executed on a single or a plurality of processors included in the apparatus for encoding a moving picture 1. For example, by executing a computer program stored in a memory included in the apparatus for encoding a moving picture 1 on the processor, the processor included in the apparatus for encoding a moving picture 1 can be operated as a hardware circuit which can execute a part or overall process of each unit illustrated in FIG. 1.

In the buffer 11, each picture included in the moving picture data is input according to the reproducing sequence. The pictures accumulated in the buffer 11 are sequentially read in accordance with the encoding sequence of the picture set by a control unit (not illustrated) for controlling the entire apparatus for encoding a moving picture 1. The read picture is input to the lower hierarchy encoding unit 12 and the upper hierarchy encoding unit 13.

Furthermore, in the buffer 11, a local decoding picture, that is a picture decoded after encoding by the lower hierarchy encoding unit 12, is written by the lower hierarchy encoding unit 12. The local decoding picture is to be referred in the upper hierarchy encoding unit 13.

The lower hierarchy encoding unit 12 encodes the picture every time when the picture is input. In the present embodiment, the lower hierarchy encoding unit 12 encodes the picture with a data rate lower than that of the upper hierarchy encoding unit 13. Furthermore, in the present embodiment, the lower hierarchy encoding unit 12 performs lossy coding of the picture.

Figure 2:
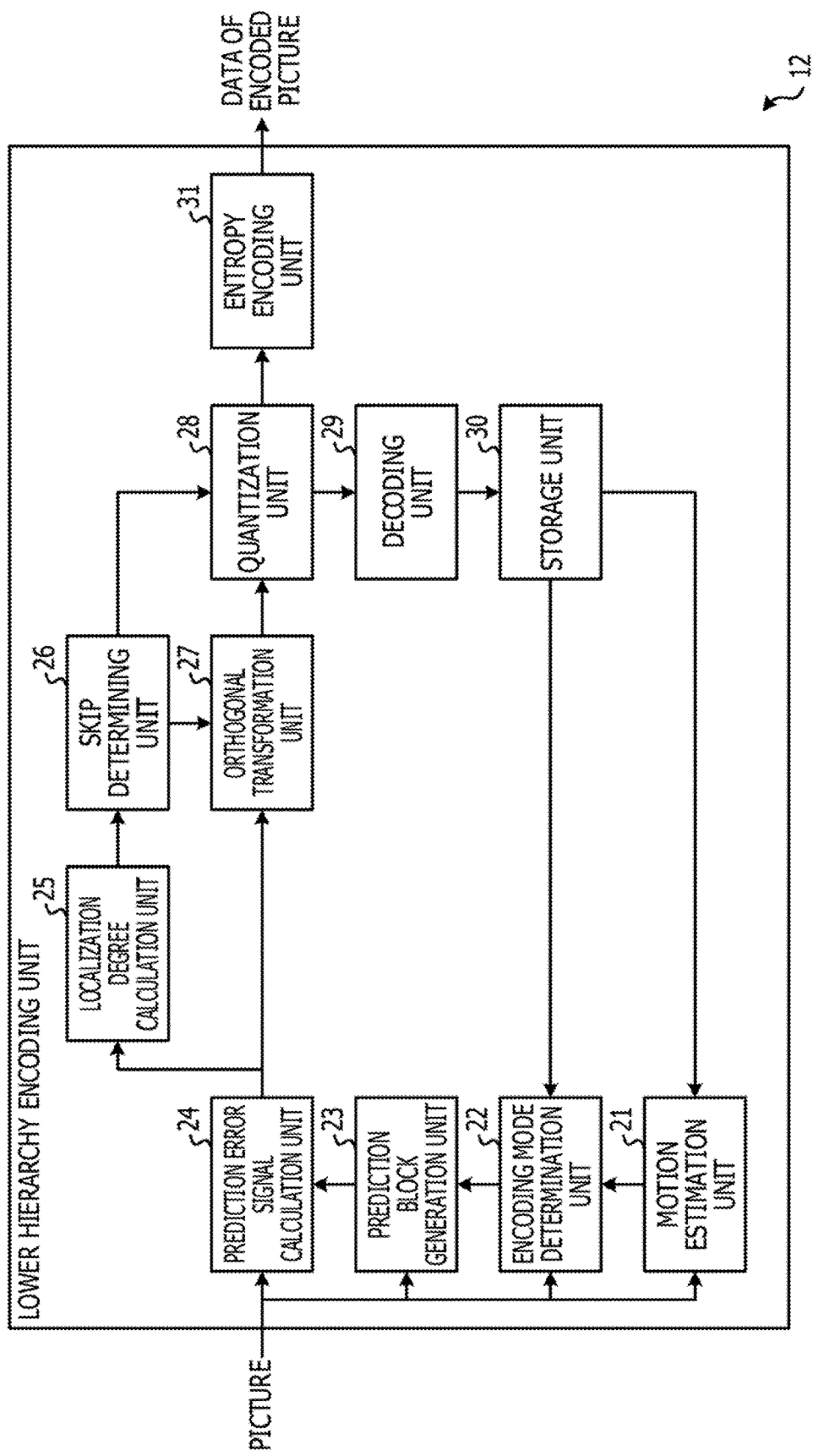
FIG. 2 is a schematic diagram illustrating a lower hierarchy encoding unit.

FIG. 2 is a schematic diagram illustrating a lower hierarchy encoding unit 12. The lower hierarchy encoding unit 12 includes a motion estimation unit 21, an encoding mode determination unit 22, a prediction block generation unit 23, a prediction error signal calculation unit 24, a localization degree calculation unit 25, a skip determining unit 26, a orthogonal transformation unit 27, a quantization unit 28, a decoding unit 29, a storage unit 30, and an entropy encoding unit 31.

In the HEVC with which the apparatus for encoding a moving picture 1 is in conformity, each picture included in the moving picture data is divided into a plurality of hierarchies. Firstly, the dividing of the picture in HEVC will be described.

Figure 3:
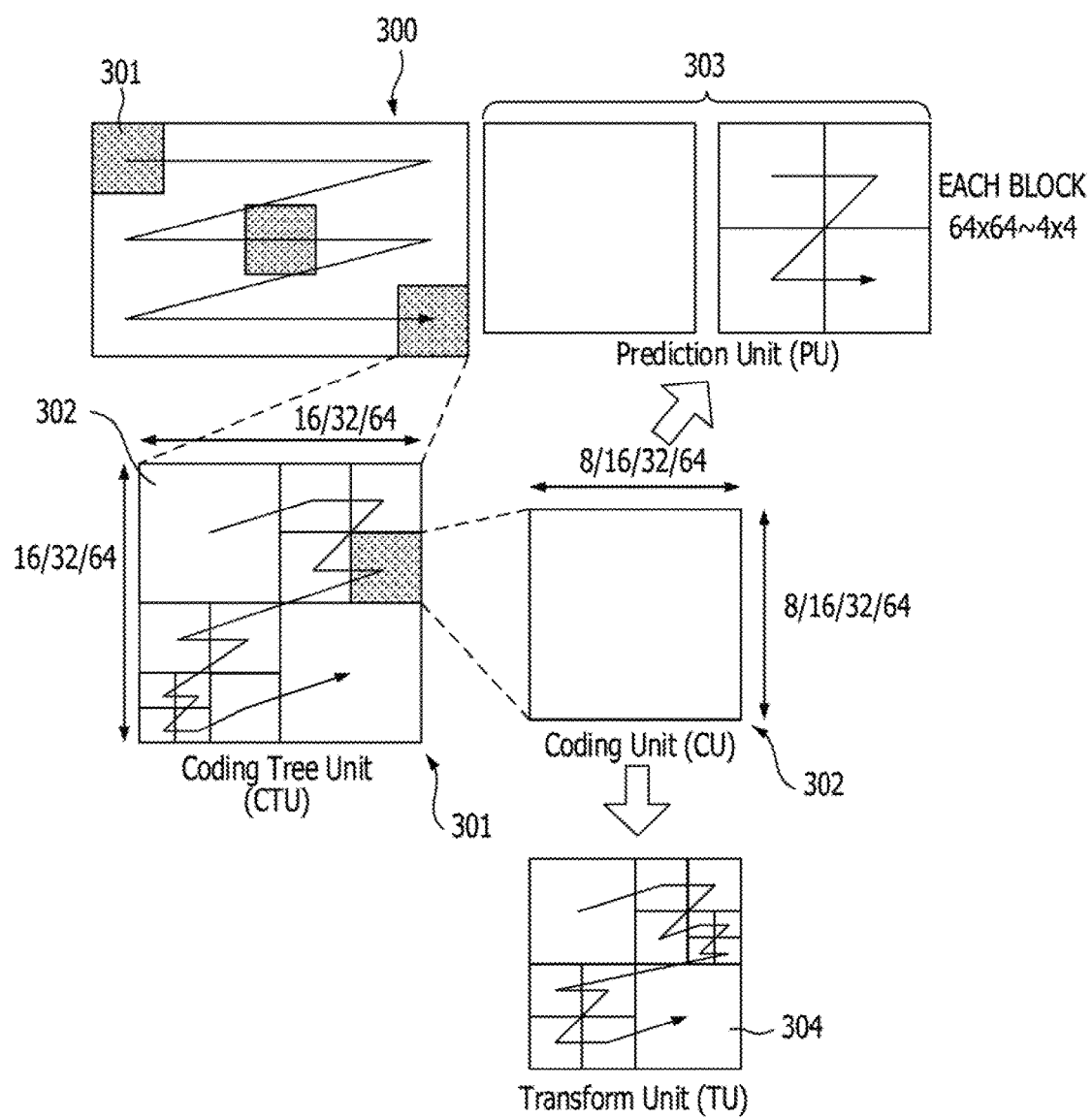
FIG. 3 is a diagram illustrating an example of dividing of a picture by HEVC.

FIG. 3 is a diagram illustrating an example of dividing of a picture by HEVC. As illustrated in FIG. 3, a picture 300 is divided into a coding tree unit (CTU) that is a unit of the coding process and each CTU 301 is encoded in raster scan order. The size of the CTU 301 can be selected from the 64×64 to 16×16 pixels.

The CTU 301 further is divided into a plurality of coding units (CU) 302 into a quad-tree structure. Each CU 302 in one CTU 301 is encoded in Z scan order. The size of the CU 302 is variable and the size thereof is selected from CU dividing modes 8×8 to 64×64 pixels. The CU 302 is a unit for selecting an intra prediction encoding mode and an inter prediction encoding mode that are an encoding mode. In the intra prediction encoding mode is the encoding mode for prediction encoding the encoding target block of the picture to be encoded by referring to information of the picture to be encoded. On the other hand, the inter prediction encoding mode is the encoding mode for prediction encoding the block to be encoded of the picture to be encoded by referring to the other encoded information.

The CU 302 is individually processed in a prediction unit (PU) 303 or in a transform unit (TU) 304. The PU 303 is a unit for generating of the prediction block in which the prediction in accordance with the encoding mode is performed. For example, in the intra prediction encoding mode, the PU 303 is a unit in which prediction mode for defining a calculation method of a value of each pixel of the prediction block and the pixel to be referred when the prediction block is generated is applied. On the other hand, in the inter prediction encoding mode, the PU 303 is a unit for performing motion compensation. In a case where the intra prediction encoding mode is applied, the size of the PU 303 can be selected form 2N×2N and N×N (N is half of the CU size). On the other hand, the TU 304 is a unit for the orthogonal transform and is subjected to discrete cosine transform (DCT) or discrete sine transform (DST) for each TU. The size of the TU 304 is selected from 4×4 pixels to 32×32 pixels. The TU 304 is divided into the quad-tree structure and is processed in the Z scan order.

The lower hierarchy encoding unit 12 encodes each CTU in the raster scan order for the picture to be encoded. Hereinafter, for each portion of the lower hierarchy encoding unit 12, a process with respect to one CUT will be described as an example.

In a case where the picture to be encoded is a P picture or B picture to which the inter prediction encoding mode is applicable, the motion estimation unit 21 calculates the motion vector for each PU to which applicable for the encoding target CTU. The P picture is a picture in which the inter prediction encoding mode is applicable in a single direction and the B picture is a picture in which the inter prediction encoding mode is applicable in both directions. The type of the encoding target picture is determined based on, for example, a structure of group of pictures (GOP) which is applied to the moving picture data to be decoded by the control unit (not illustrated) and the position of the encoding target picture in the GOP.

The motion estimation unit 21 specifies the reference block which is most corresponding to the focusing PU by performing block matching with respect to the referable region for the local decoding picture, for the focusing PU of the encoding target CTU. The motion estimation unit 21 calculates a vector indicating the motion amount between the focusing PU and the reference block as a motion vector. The motion estimation unit 21 notifies the encoding mode determination unit 22 of the motion vector of each PU.

The encoding mode determination unit 22 determines the CU, PU, and TU dividing modes for dividing the encoding target CTU and the encoding mode to be applied for each CU. The encoding mode determination unit 22 determines the encoding mode of the CTU based on the information indicating the type of the picture to be encoded in which the encoding target CTU is included, which is acquired from the control unit (not illustrated) for example. If the type of the picture to be encoded is an I picture to which only the intra prediction encoding mode is applicable, the encoding mode determination unit 22 selects the intra prediction encoding mode as an encoding mode to be applied. In addition, if the type of the picture to be encoded is the P picture or the B picture, the encoding mode determination unit 22 selects any of the intra prediction encoding mode and the intra prediction encoding mode, as an encoding mode to be applied.

The encoding mode determination unit 22 calculates each encoding cost, that is an evaluation value of the encoded data amount of the encoding target CTU for the applicable encoding mode, in the CU. For example, regarding the inter prediction encoding mode, the encoding mode determination unit 22 calculates the encoding cost for each combination of the CU dividing mode and PU dividing mode which divide the CTU and a vector mode for defining a generating method of the prediction vector of the motion vector. The encoding mode determination unit 22 can use any of an adaptive motion vector prediction (AMVP) mode and a merge mode as the vector mode, for example.

In addition, regarding the intra prediction encoding mode, the encoding mode determination unit 22 calculates the encoding cost for each combination of the CU dividing mode and the PU dividing mode which divides the CTU and the prediction mode.

For calculating the encoding cost, the encoding mode determination unit 22 calculates, for example, a prediction error, that is a sum of absolute pixel differences SAD, for the focusing PU, according to the following expression.

SAD=Σ|OrgPixel−PredPixel|

Here, OrgPixel represents a value of the pixel included in the focusing PU and PredPixel represents a value of the pixel included in the prediction block corresponding to the focusing block. The prediction block is a prediction block generated according to the encoding mode that is a calculation target of the encoding cost.

The encoding mode determination unit 22 calculates, for example, an encoding cost Cost for the focusing CU according to the following expression.

Cost=ΣSAD+λ*B

Here, ΣSAD represents a total sum of the calculated SADs for each PU included in the focusing CU. In addition, B represents an estimation value of the encoding amount for an item such as a flag indicating the motion vector and the prediction mode other than the prediction error. The λ represents the Lagrange's undetermined multiplier.

The encoding mode determination unit 22 may calculate a sum of the absolute values SATD of the Hadamard coefficient of each pixel after the difference image between the focusing PU and the prediction block is subjected to the Hadamard transformation, or the like, instead of the SAD.

The encoding mode determination unit 22 sets, for example, the focusing CU in decreasing order of the size among the obtaining CU sizes, for the CTU to be encoded. The encoding mode determination unit 22 selects the prediction mode in which the cost is minimized for each PU dividing mode in the CU relating to the intra prediction encoding mode, for the focusing CU.

In addition, the encoding mode determination unit 22 selects the vector mode in which the cost is minimized for each PU dividing mode in the CU relating to the inter prediction encoding mode, for the focusing CU. Furthermore, the encoding mode determination unit 22 selects a mode in which the encoding cost is small among the intra prediction encoding mode and the inter prediction encoding mode, for each CU having the same size, as an encoding mode to be applied in the CU.

Furthermore, the encoding mode determination unit 22 executes the same process for each of the CUs which is obtained by dividing the focusing CU into four CUs as a next focusing CU, and calculates a minimum encoding cost. If the total sum of the minimum encoding costs which are calculated for each of the four divided CUs is smaller than the minimum encoding cost for the focusing CU, the encoding mode determination unit 22 divides the focusing CU into four. The encoding mode determination unit 22 determines the CU dividing mode and the PU dividing mode to be applied to the CTU to be encoded by repeating the above processes until each CU is not divided.

Furthermore, the encoding mode determination unit 22 determines the TU dividing mode for each CU according to the CU dividing mode which is determined in the above-described manner. In this case, the encoding mode determination unit 22 calculates a RD cost Cost according to the following expression, for each applicable TU dividing mode.

$$\text{Cost} = \sum_i (\text{org}(i) - ldec(i))^2 + \lambda \cdot \text{bit} \quad (1)$$

Here, org(i) represents a value of the pixel included in the focusing CU and ldec(i) represents a value of a decoding pixel obtained such that the CU is encoded by using the TU dividing mode and further decoded. In addition, bit represents an encoding amount when the CU is encoded by using the focusing TU dividing mode. A first item of the right side in the (1) Expression represents an encoding distortion and a second item of the right side represents the encoding amount. Therefore, in the TU dividing mode in which the RD cost becomes minimized, an optimum balance between the encoding distortion and the encoding amount is obtained.

The encoding mode determination unit 22 selects the TU dividing mode in which the RD cost Cost becomes minimized.

The encoding mode determination unit 22 notifies the prediction block generation unit 23 of the combination of the CU and PU dividing modes which are selected for CTU to be encoded and the encoding mode. The encoding mode determination unit 22 notifies the prediction error signal calculation unit 24 of the TU dividing mode. In addition, the encoding mode determination unit 22 saves the combination of the CU, PU, and TU dividing modes which are selected for the CTU to be encoded and the encoding mode to the storage unit 30.

The prediction block generation unit 23 generates the prediction block for each PU according to the combination of the CU and PU dividing modes which are selected for the CTU to be encoded and the encoding mode. For example, in a case where the focusing CU is subjected to the intra prediction encoding, the prediction block generation unit 23 generates the prediction block by motion compensating the local decoding picture which is read form the storage unit 30 for each PU in the CU based on the motion vector calculated for the PU.

In addition, in a case where the focusing CU is subjected to the intra prediction encoding, the prediction block generation unit 23 generates the prediction block to be referred according to the prediction mode which is selected for each PU in the CU, based on the value of the pixel in the local decoding block around the PU.

The prediction block generation unit 23 transmits the generated prediction block to the prediction error signal calculation unit 24.

The prediction error signal calculation unit 24 executes a difference operation between the corresponding pixels of the prediction block generated by the prediction block generation unit 23, for each pixel in the CTU to be encoded. The prediction error signal calculation unit 24 sets the difference value corresponding to each pixel in the TU obtained by the difference operation as a prediction error signal of the TU, for each TU in the encoding target CTU. The prediction error signal calculation unit 24 transmits the TU having a size greater than the 4×4 pixel size among each TU in the encoding target CTU, that is, the prediction error signal for TU to which the Transform Skip is not applied, to the orthogonal transformation unit 27. On the other hand, the prediction error signal calculation unit 24 transmits the TU having a size of the 4×4 pixel size among each TU in the encoding target CTU, that is, the prediction error signal for TU to which the Transform Skip is applied, to the localization degree calculation unit 25 and the quantization unit 28.

In the encoding target CTU, the localization degree calculation unit 25 calculates the localization degree indicating the degree where the pixel having the non-zero value is localized, included in the prediction error signal for the TU having a size of 4×4 pixels having a possibility that the Transform Skip is applied.

In a case where the pixel having the non-zero value is localized, since the error caused by the orthogonal transformation and the quantization of the prediction error signal is diffused by the inverse orthogonal transformation, in the local decoding block corresponding to the TU, there is a possibility that the number of pixels having a value different from the value of the original pixel.

Figure 4A:
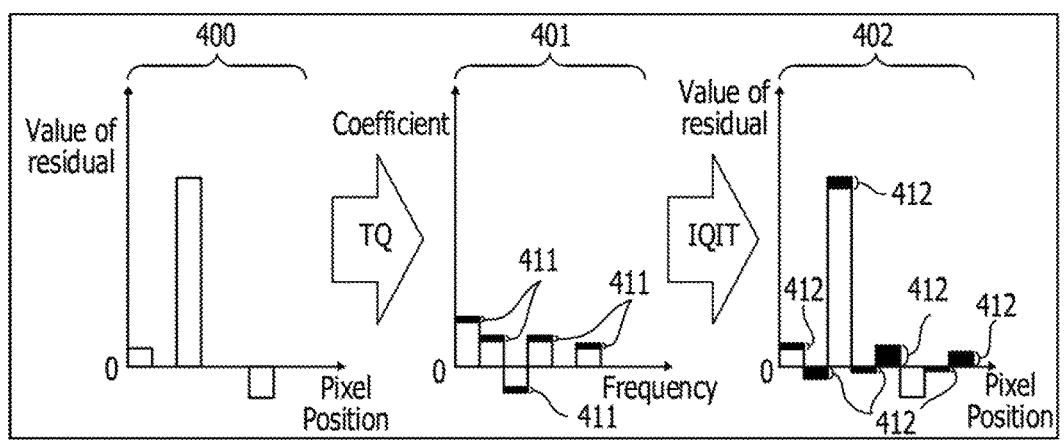
FIG. 4A is a diagram illustrating changes in a value of a pixel which is obtained such that a prediction error signal of TU is subjected to orthogonal transformation and quantization and then subjected to dequantization and inverse orthogonal transformation.
Figure 4B:
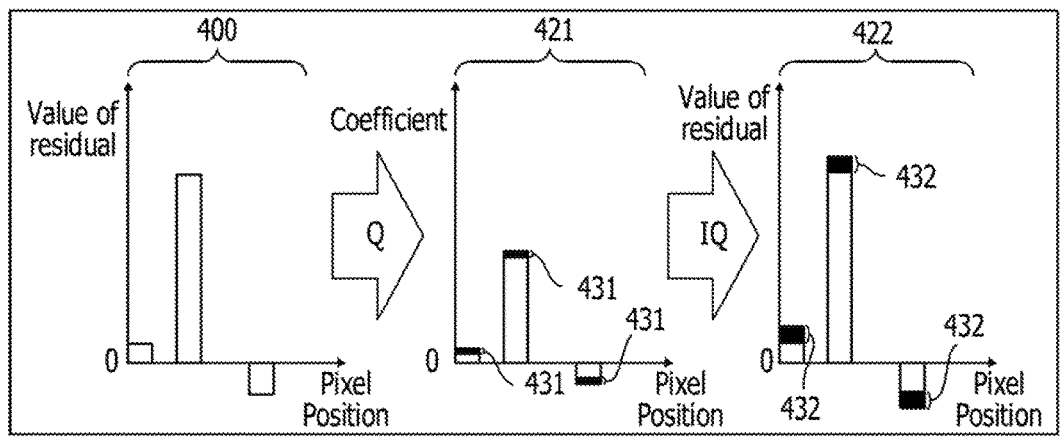
FIG. 4B is a diagram illustrating changes in a value of a pixel obtained such that the prediction error signal of the TU is directly subjected to quantization and then subjected to dequantization.

FIG. 4A is a diagram illustrating changes in a value of a pixel which is obtained such that a prediction error signal of TU is subjected to orthogonal transformation and quantization and then subjected to dequantization (inverse quantization) and inverse orthogonal transformation. On the other hand, FIG. 4B is a diagram illustrating changes in a value of a pixel obtained such that the prediction error signal of the TU is directly subjected to quantization and then subjected to dequantization. In FIG. 4A and FIG. 4B, for simplification, only the value of a pixel in a row is illustrated. In addition, in FIG. 4A and FIG. 4B, the horizontal axis represents a position and the vertical axis represents a pixel value.

In an example of FIG. 4A, the number of the pixels having non-zero value is three in an original prediction error signal 400. However, in a quantized orthogonal transformation coefficient 401 which is obtained by performing the orthogonal transformation and the quantization of the prediction error signal 400, the coefficient having the non-zero value is three or more. Therefore, in the pixel in which the coefficient is three or more, an error 411 is included. Furthermore, in a decoding prediction error signal 402 which is obtained by the dequantization and the orthogonal transformation of the quantized orthogonal transformation coefficient 401, the error 411 is diffused to a plurality of pixels. As a result, in this example, an error 412 is included in 7 pixels. Therefore, in also local decoding block (not illustrated) which is obtained by adding the corresponding prediction block to the decoding prediction error signal 402, the value of the pixel of the original block is different for the pixel in which the error is diffused.

On the other hand, in the example of FIG. 4B, since the original prediction error signal 400 is directly quantized, in the quantized prediction error signal 421, the value having a zero value is not changed, there is possibility that an error 431 is included in the pixel value only for the pixel having a non-zero value. Accordingly, even in the decoding prediction error signal 422 obtained by dequantizing the quantized prediction error signal 421, the number of the pixel has a possibility that the error 432 is included is equal to or less than the number of pixels having the non-zero value in the original prediction error signal 400. In this example, since the number of pixels having the non-zero value is three in the original prediction error signal 400, even in the decoding prediction error signal 422, the number of pixels in which the error 432 is included is three. Accordingly, the number of pixels in which the error is included in the decoding prediction error signal 422 is less than the number of pixels in which the error is included in the decoding prediction error signal 402 in the example illustrated in FIG. 4A.

Here when inter-hierarchy prediction encoding of the focusing block of the picture in the upper hierarchy that is positioned at the same position as the local decoding block, it is assume that the local decoding block is used as the prediction block. In this case, the focusing block and the local decoding block correspond to the same region of the same picture. Therefore, if there is no error in the local decoding block, the pixel values for the overall pixels are identical between the local decoding block and the focusing block, and the value of the overall pixels becomes zero in the prediction error signal between the local decoding block and the focusing block. However, as illustrated in FIG. 4A and the FIG. 4B, if there is a pixel in which the error is included in the decoding prediction error signal, the error is included in the pixel, even in the local decoding block. As a result, in the prediction error signal between the local decoding block and the focusing block, the pixel having the non-zero value which has the same number as the number of the pixels in which the error is included in the decoding prediction error signal. In the present embodiment, since the picture is subjected to the lossless coding in the upper hierarchy, the prediction error signal is subjected to the direct entropy encoding in the upper hierarchy. Therefore, the bit stream which is obtained by the entropy encoding becomes longer, as the number of pixels having the non-zero value increases in the prediction error signal. Accordingly, the encoding efficiency is deteriorated. In the example, the number of pixels in which the error is included in the decoding prediction error signal 402 in FIG. 4A is greater than the number of pixels in which the error is included in the decoding prediction error signal 422 in FIG. 4B. Therefore, in a case where the local decoding block calculated from the decoding prediction error signal 402 is used, the encoding efficiency is deteriorated in the upper hierarchy, than a case where the local decoding block calculated from the decoding prediction error signal 422 is used. Therefore, in such a case, the encoding amount to be reduced in the upper hierarchy is greater than the encoding amount to be increased by applying the Transform Skip with respect to the TU in the lower hierarchy. Accordingly, the encoding efficiency is improved as a whole.

On the other hand, in the lower hierarchy, in the orthogonal transformation coefficient which is obtained by subjecting the prediction error signal to the orthogonal transformation, the coefficient corresponding to the high frequency generally becomes a relatively small value. Therefore, in a case of performing the quantization of the orthogonal transformation coefficient, there is high possibility that the number of pixels having the non-zero value becomes smaller than a case of performing the direct quantization of the prediction error signal. Accordingly, in the lower hierarchy, in a case where the number of pixels having the non-zero value in the prediction error signal is large, when the entropy encoding of the coefficient obtained by subjecting the prediction error signal to the orthogonal transformation and quantized, the encoding efficient is improved.

In the present embodiment, in a case where the localization degree of the pixel having the non-zero value is high in the prediction error signal of the TU, the lower hierarchy encoding unit 12 applies the Transform Skip with respect to the prediction error signal of the TU. That is, lower hierarchy encoding unit 12 directly quantizes the prediction error signal of the TU. On the other hand, in a case where the localization degree is low, the lower hierarchy encoding unit 12 may not apply the Transform Skip with respect to the TU.

In the present embodiment, the localization degree calculation unit 25 calculates SAD and SATD based on the prediction error signal for focusing TU. The localization degree calculation unit 25 calculates the feature amount R indicating the localization degree according to the flowing expression.

$$R = \frac{SAD}{SATD} \quad (2)$$

As the number of pixels having the non-zero value is small in the prediction error signal, in the Hadamard coefficient, the coefficient having the non-zero value is increased even in the coefficient corresponding to the other than the direct current components. Therefore, as the localization degree is high, the feature amount R becomes the small value.

The localization degree calculation unit 25 notifies the skip determining unit 26 of the calculated feature amount R and the prediction error signal for each of TU having a possibility that the Transform Skip is applied.

In the encoding target CTU, The skip determining unit 26 determined whether the Transform Skip is applied for each TU having a possibility that the Transform Skip is applied based on the feature amount R indicating the localization degree.

As described above, as the localization degree of the pixel having the non-value is high in the prediction error signal, the value of the feature amount R calculated by the localization degree calculation unit 25 is deteriorated. In a case where the feature amount F of the focusing TU is equal to or less than the predetermined threshold amount, the skip determining unit 26 determines that the Transform Skip is applied in the TU. On the other hand, in a case where the feature amount R of the focusing TU is greater than the predetermined threshold value, the skip determining unit 26 determines that the Transform Skip is not applied in the TU. The predetermined threshold value is set to 0.4, for example.

The skip determining unit 26 outputs the prediction error signal of the TU determined that the Transform Skip is applied to the quantization unit 28. On the other hand, the skip determining unit 26 outputs the prediction error signal of the TU determined that the Transform Skip is not applied to the orthogonal transformation unit 27.

The orthogonal transformation unit 27 obtains the orthogonal transformation coefficient indicating the frequency component of the prediction error signal in the horizontal direction and the frequency of the prediction error signal in the vertical direction by subjecting the prediction error signal of the TU to the orthogonal transformation, for each TU in which the Transform Skip in the encoding target CTU is not applied. For example, the orthogonal transformation unit 27 obtains a set of the DCT coefficient as the orthogonal transformation coefficient by executing the DCT as the orthogonal transformation process with respect to prediction error signal.

The orthogonal transformation unit 27 transmits the orthogonal transformation coefficient for each TU in which the Transform Skip is not applied to the quantization unit 28.

In the encoding target CTU, the quantization unit 28 calculates the quantized orthogonal transformation coefficient by quantizing the orthogonal transformation coefficient for each TU, to which the Transform Skip is not applied, according to the quantization parameter including a qp value for specifying the quantization width. In addition, the quantization unit 28 calculates the quantized prediction error signal by quantizing the prediction error signal for each TU to which the Transform Skip is applied according to the quantization parameter. Hereinafter, the quantized orthogonal transformation coefficient and the quantized prediction error signal quantized coefficient are simply referred to as the quantization coefficient.

The quantization unit 28 outputs the quantization coefficient (e.g. the quantized orthogonal transformation coefficient) to the decoding unit 29 and the entropy encoding unit 31.

The decoding unit 29 generates the local decoding block to be referred for encoding the CU or the like after the TU form the quantized coefficient of each TU in the encoding target CTU and stores the generated local decoding block to the storage unit 30.

Therefore, the decoding unit 29 reconstructs the orthogonal transformation coefficient or the prediction error signal by dequantizing the quantized coefficient which is quantized of each TU.

The decoding unit 29 performs the inverse orthogonal transformation with respect to the reconstructed orthogonal transformation coefficient for each TU to which the Transform Skip is not applied. For example, in a case where the orthogonal transformation unit 27 uses the DCT as the orthogonal transformation, the decoding unit 29 executes the inverse DCT process as the inverse orthogonal transformation. Accordingly, the decoding unit 29 reconstructs the prediction error signal including information same as that of the prediction error signal before encoding for each TU. In the TU to which the Transform Skip is applied, the decoding unit 29 may not perform the inverse orthogonal transformation.

The decoding unit 29 generates the local decoding block by adding the reconstructed prediction error signal to each pixel value of the prediction block of the TU for each TU.

The decoding unit 29 stores the local decoding block to the storage unit 30 every time when the local decoding block is generated.

Furthermore, the decoding unit 29 writes the local decoding picture which is obtained by combining one or more of the local decoding blocks for one picture according to the encoding sequence of the each CTU to the buffer 11.

The storage unit 30 temporarily stores the local decoding block which is received from the decoding unit 29. The storage unit 30 supplies the local decoding picture or the local decoding block to the motion estimation unit 21, the encoding mode determination unit 22, and the prediction block generation unit 23. The storage unit 30 stores the predetermined number of the local decoding pictures set in advance, that is a possibility that the local decoding picture is to be referred by the encoding target picture. In a case where the number of the local decoding picture exceeds the predetermined number, the storage unit 30 discards the oldest local decoding picture in the encoding sequence.

In addition, the storage unit 30 stores the motion vector for each of the local decoding block which is subjected to the inter prediction encoding.

Furthermore, the storage unit 30 stores a combination of the CU, PU, and TU dividing modes which are selected for each CTU and the encoding mode.

The entropy encoding unit 31 performs entropy encoding of syntax for specifying the prediction vector, the quantization coefficient of each TU of the CTU to be encoded, and a prediction error signal of the motion vector of each PU. In the present embodiment, the entropy encoding unit 31 uses an arithmetic encoding process that is a context-based adaptive binary arithmetic coding (CABAC) as entropy encoding technique. The entropy encoding unit 31 combines bit streams obtained through the entropy encoding in a predetermined sequence, and adds header information or the like defined by HEVC to obtain the encoded bit stream including the encoded moving picture data. The entropy encoding unit 31 outputs the encoded bit stream to the multiplexing unit 14.

Figure 5:
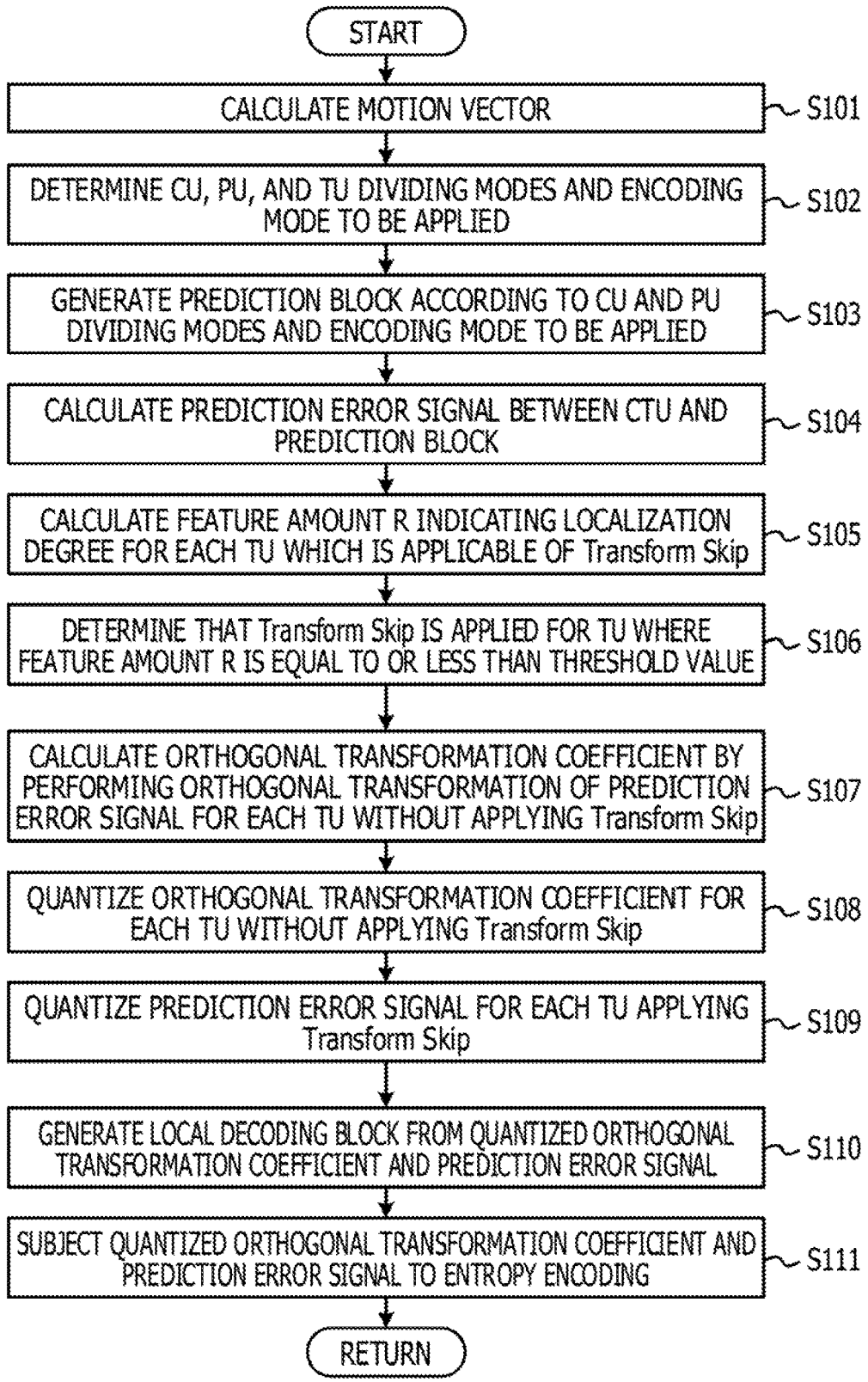
FIG. 5 is a flowchart of operation of a lower hierarchy encoding process.

FIG. 5 is a flowchart of operation of a lower hierarchy encoding process to be executed by the lower hierarchy encoding unit 12. The lower hierarchy encoding unit 12 executes the lower hierarchy encoding process according to the flow chart of operation to be disclosed for each CTU.

The motion estimation unit 21 calculates the motion vector for each PU which is applicable in the encoding target CTU (step S101). The motion estimation unit 21 notifies the encoding mode determination unit 22 of the motion vector of each PU. In a case where the encoding target picture in which the encoding target CTU is the I picture, the process of step S101 may be omitted.

The encoding mode determination unit 22 determines the dividing modes of each CU, PU, and TU and the encoding mode to be applied for the encoding target CTU (step S102). The encoding mode determination unit 22 notifies the prediction block generation unit 23 of the CU and PU dividing modes and the encoding mode to be applied, and notifies the prediction error signal calculation unit 24 of the TU dividing mode. In addition, the encoding mode determination unit 22 stores the each of the CU, PU, and TU dividing modes and encoding mode to be applied to the storage unit 30.

The prediction block generation unit 23 generates the prediction block according to the determined CU and PU dividing mode and the encoding mode to be applied (step S103). The prediction block generation unit 23 transmits the generated prediction block to the prediction error signal calculation unit 24.

The prediction error signal calculation unit 24 calculates the prediction error signal between the encoding target CTU and the prediction block (step S104).

The prediction error signal calculation unit 24 transmits the TU having a size greater than 4×4 pixels, among the TUs of the encoding target CTU, that is, the TU to which the Transform Skip is not applied to the orthogonal transformation unit 27. The prediction error signal calculation unit 24 transmits the TU having a size of 4×4 pixels, that is, the TU having a possibility that the Transform Skip is applied to the localization degree calculation unit 25.

The localization degree calculation unit 25 calculates the feature amount R indicating the localization degree for each TU having a possibility that the Transform Skip is applied (step S105). The localization degree calculation unit 25 transmits the feature amount R and the prediction error signal for each of TU to the skip determining unit 26.

The skip determining unit 26 compares the feature amount R and the predetermined threshold value for each TU having a possibility that the Transform Skip is applied and determines that the Transform Skip is applied to the TU where the feature amount R is equal to or less than the predetermined threshold value (step S106). The skip determining unit 26 transmits the prediction error signal of the TU applying the Transform Skip to the quantization unit 28 and transmits the prediction error signal of the TU without applying the Transform Skip to the orthogonal transformation unit 27.

The orthogonal transformation unit 27 calculates the orthogonal transformation coefficient by subjecting the prediction error signal of each TU to which the Transform Skip is not applied to the orthogonal transformation (step S107). The orthogonal transformation unit 27 transmits the orthogonal transformation coefficient of each TU to which the Transform Skip is not applied to the quantization unit 28.

The quantization unit 28 quantizes the orthogonal transformation coefficient for the TU to which the Transform Skip is not applied, among the each TU of the encoding target CTU (step S108). The quantization unit 28 directly quantizes the prediction error signal for the TU to which the Transform Skip is applied, among the each TU of the encoding target CTU (step S109). The quantization unit 28 outputs the quantized orthogonal transformation coefficient or the quantized prediction error signal to the decoding unit 29 and the entropy encoding unit 31.

The decoding unit 29 generates the local decoding block corresponding to the CTU from the quantized coefficient (e.g. the quantized orthogonal transformation coefficient or the quantized prediction error signal) for each TU of the encoding target CTU (step S110). The decoding unit 29 stores the local decoding block to the storage unit 30.

The entropy encoding unit 31 subjects at least either one of the quantized orthogonal transformation coefficient or the quantized prediction error signal for each TU of the encoding target CTU to the entropy encoding (step S111). In the step 111, the entropy encoding unit 31 may subject the prediction error for the motion vector or the like to the entropy encoding. The entropy encoding unit 31 outputs the obtained bit stream to the multiplexing unit 14. The lower hierarchy encoding unit 12 terminates the lower hierarchy encoding process with respect to one CTU.

The upper hierarchy encoding unit 13 encodes the picture for every time when the picture is input. In the present embodiment, the upper hierarchy encoding unit 13 encodes the picture with a data rate higher than that of the lower hierarchy encoding unit 12. In addition, in the present embodiment, the upper hierarchy encoding unit 13 subjects the picture to lossless coding.

Figure 6:
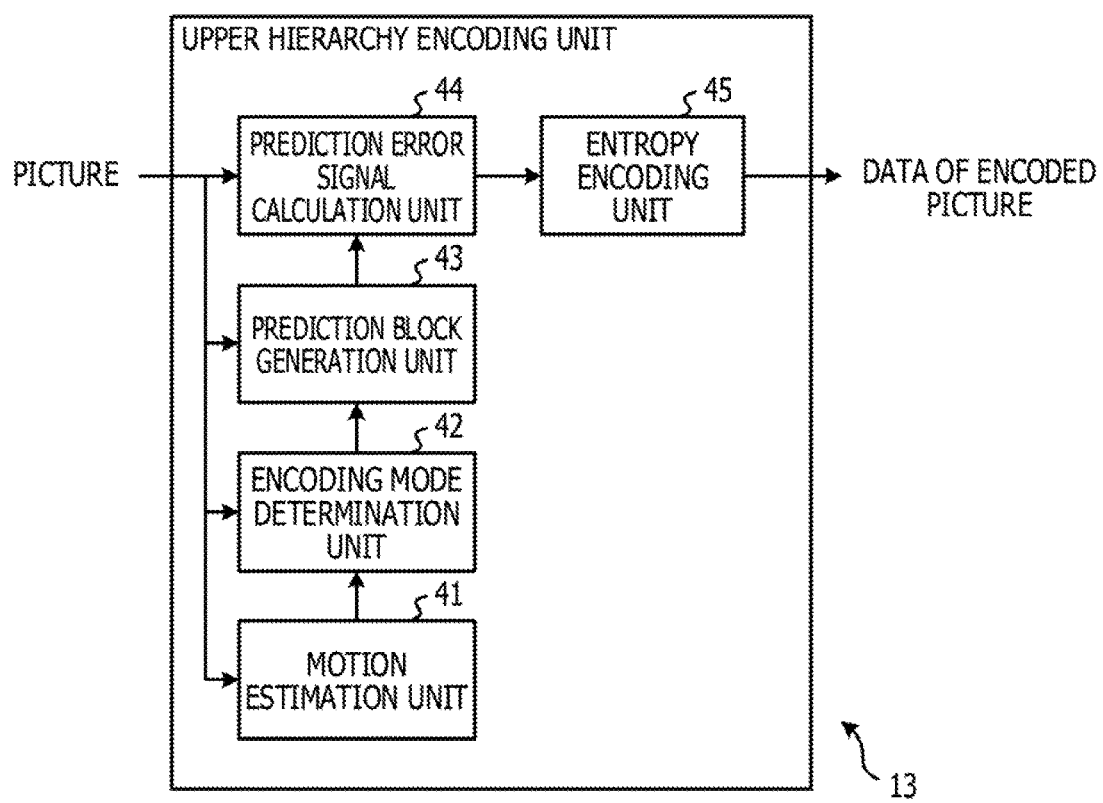
FIG. 6 is a block diagram of an upper hierarchy encoding unit.

FIG. 6 is a block diagram of the upper hierarchy encoding unit 13. The upper hierarchy encoding unit 13 includes a motion estimation unit 41, an encoding mode determination unit 42, a prediction block generation unit 43, a prediction error signal calculation unit 44, and an entropy encoding unit 45.

In the same manner as that of the lower hierarchy encoding unit 12, the upper hierarchy encoding unit 13 encodes each CTU in the raster scan order for the picture to be encoded. Hereinafter, for each portion of the upper hierarchy encoding unit 13, a process with respect to one CUT will be described as an example.

The motion estimation unit 41 executes the same process as that of the motion estimation unit 21 included in the lower hierarchy encoding unit 12 and calculates the motion vector of each PU for the picture which is applicable of the inter prediction encoding mode. However, the motion estimation unit 41 may refer the local picture which is obtained by lower hierarchy encoding unit 12 as an example of the referring picture when motion estimating. In particular, the correlation between the local decoding picture which is obtained by decoding the encoding target picture after encoding once by the lower hierarchy encoding unit 12 and the encoding target picture is considerably high. Therefore, there is a possibility that the prediction error signal is considerably small by generating the prediction block from the local decoding picture.

The motion estimation unit 41 outputs the motion vector of each PU to the encoding mode determination unit 42.

The encoding mode determination unit 42 executes the same process as that of the encoding mode determination unit 22 included in the lower hierarchy encoding unit 12, and determines the applying CU dividing mode and PU dividing mode, and the encoding mode such that the encoding cost becomes minimized for the CTU to be encoded. The encoding mode determination unit 42 also calculates the encoding cost in a case where the prediction block is generated from the local decoding picture obtained from the lower hierarchy encoding unit 12, that is, a case where the inter-hierarchy prediction encoding mode is applied.

The encoding mode determination unit 42 notifies the prediction block generation unit 43 of the applying CU dividing mode and PU dividing mode, and encoding mode for the CTU to be encoded.

The prediction block generation unit 43 executes the same process as that of the prediction block generation unit 23 included in the lower hierarchy encoding unit 12 and generates the prediction block for each PU according to the applying CU dividing mode and the PU dividing mode, and the encoding mode, for the CTU to be encoded. The prediction block generation unit 43 outputs the generated prediction block to the prediction error signal calculation unit 44.

The prediction error signal calculation unit 44 executes the same process as that of the prediction error signal calculation unit 24 included in the lower hierarchy encoding unit 12 and calculates the prediction error signal for the CTU to be encoded. In the present embodiment, since the upper hierarchy encoding unit 13 subjects the picture to the lossless coding, the orthogonal transformation and the quantization with respect to the prediction error signal are not performed. Therefore, the prediction error signal calculation unit 44 directly outputs the prediction error signal to the entropy encoding unit 45.

The entropy encoding unit 45 performs entropy encoding of the prediction error signal of the CTU to be encoded by executing the same process as that of the entropy encoding unit 31 included in the lower hierarchy encoding unit 12. Furthermore, the entropy encoding unit 45 performs the entropy encoding of the Information for specifying the CU dividing mode, the PU dividing mode, and the encoding mode and the prediction error between the motion vector and the prediction vector. The entropy encoding unit 45 combines bit streams obtained through the entropy encoding in a predetermined sequence, and adds header information or the like defined by HEVC to obtain the encoded bit stream including the encoded moving picture data including the moving picture data in the upper hierarchy. The entropy encoding unit 45 outputs the encoded bit stream to the multiplexing unit 14.

The multiplexing unit 14 combines an encoding bit stream in the lower hierarchy output from the lower hierarchy encoding unit 12 and an encoding bit stream in the upper hierarchy output from the upper hierarchy encoding unit 13 in a predetermined sequence. Furthermore, the multiplexing unit 14 adds header information or the like defined by HEVC to the combined encoding bit stream.

Figure 7:
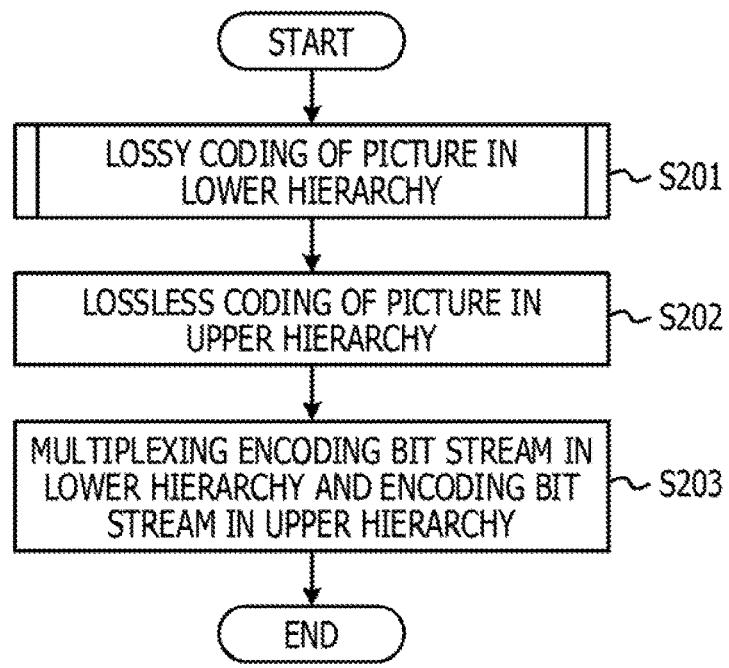
FIG. 7 is a flowchart of operation of a moving picture encoding process.

FIG. 7 is a flowchart of operation of a moving picture encoding process by the apparatus for encoding a moving picture 1. The apparatus for encoding a moving picture 1 performs encoding for each picture according to the following flowchart of the operation.

The lower hierarchy encoding unit 12 divides the picture for each CTU and executes the lossy lower hierarchy encoding process for each CUT to encode the picture thereof (step S201). The lower hierarchy encoding unit 12 outputs the bit stream including the encoding data of the picture to the multiplexing unit 14 and saves the local decoding picture to the buffer 11.

The upper hierarchy encoding unit 13 divides the picture into for each CTU and subjects the divided picture to the lossless coding for each CTU (step S202). The upper hierarchy encoding unit 13 outputs the bit stream including the encoding data of the picture to the multiplexing unit 14.

The multiplexing unit 14 multiplexes the bit stream including the encoding data of the picture in lower hierarchy and the bit stream including the encoding data of the picture in the upper hierarchy (step S203). The multiplexing unit 14 outputs the multiplexed bit streams. The apparatus for encoding a moving picture 1 terminates the moving picture encoding process.

As described above, in the apparatus for encoding a moving picture which subjects the moving picture data to the scalable encoding, the lower hierarchy encoding unit applies the Transform Skip to the TU which has a large number of pixels having the non-zero value included in the prediction error signal. In other words, when the number of pixels with the non-zero value in the prediction error signal is larger than a threshold value, the lower hierarchy encoding unit may apply the Transform Skip to the TU. Therefore, when the upper hierarchy encoding unit for executing the lossless coding subjects the block to the inter-hierarchy prediction encoding by referring to the local decoding block corresponding to the TU, the number of pixels having the non-zero value in the prediction error signal is suppressed. Therefore, the apparatus for encoding a moving picture improves the encoding efficiency as a whole.

Next, the apparatus for encoding a moving picture according to a second embodiment will be described. The apparatus for encoding a moving picture according to the second embodiment performs the scalable encoding by dividing the moving picture data into three or more levels of the hierarchy.

Figure 8:
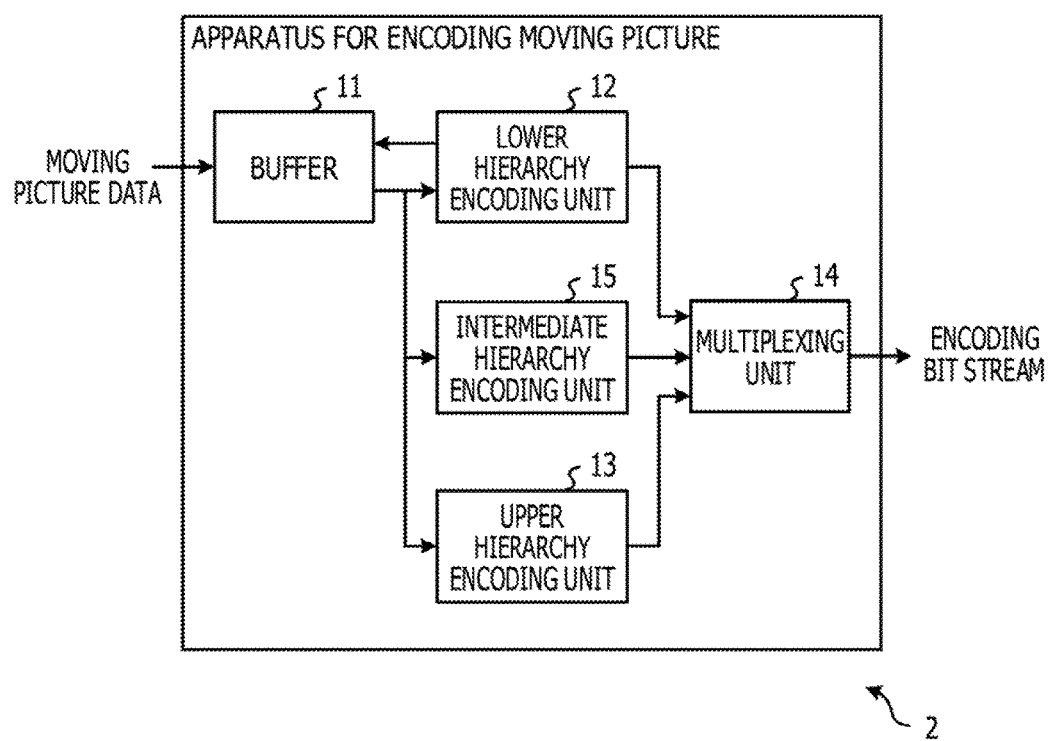
FIG. 8 is a schematic diagram of an apparatus for encoding a moving picture according to a second embodiment.

FIG. 8 is a schematic diagram of the apparatus for encoding a moving picture according to the second embodiment. The apparatus for encoding a moving picture 2 includes the buffer 11, the lower hierarchy encoding unit 12, an intermediate hierarchy encoding unit 15, the upper hierarchy encoding unit 13, and the multiplexing unit 14.

Each unit included in the apparatus for encoding a moving picture 2 is formed as a separate circuit, respectively. Alternatively, these units included in the apparatus for encoding a moving picture 2 may be mounted at the apparatus for encoding a moving picture 2 as a single or a plurality of integrated circuits in which a circuit corresponding to each unit is integrated. Furthermore, each unit included in the apparatus for encoding a moving picture 2 may be a functional module which is realized by a computer program which is executed on a processor included in the apparatus for encoding a moving picture 2.

The apparatus for encoding a moving picture 2 according to the second embodiment is different from the apparatus for encoding a moving picture 1 according to the first embodiment, in that the apparatus for encoding a moving picture 2 includes the intermediate hierarchy encoding unit 15. Hereinafter, the intermediate hierarchy encoding unit 15 and the relation portion will be described.

In this present embodiment, the lower hierarchy encoding unit 12 saves the information indicating the position and the range of the TU for each TU to which the Transform Skip is applied, and saves the local decoding picture to the buffer 11.

The intermediate hierarchy encoding unit 15 subjects each picture included in the moving picture data to the lossy coding by using the local decoding picture which is generated by the lower hierarchy encoding unit 12 as an example of the reference picture. In addition, the Intermediate hierarchy encoding unit 15 encodes each picture with a data rate higher than that of the lower hierarchy encoding unit 12. That is, the intermediate hierarchy encoding unit 15 encodes each picture such that the good image quality of the picture which is obtained by decoding the encoding data by the intermediate hierarchy encoding unit 15 is obtained as compared to the image quality of the picture which is obtained by decoding the encoding data by the lower hierarchy encoding unit 12.

Figure 9:
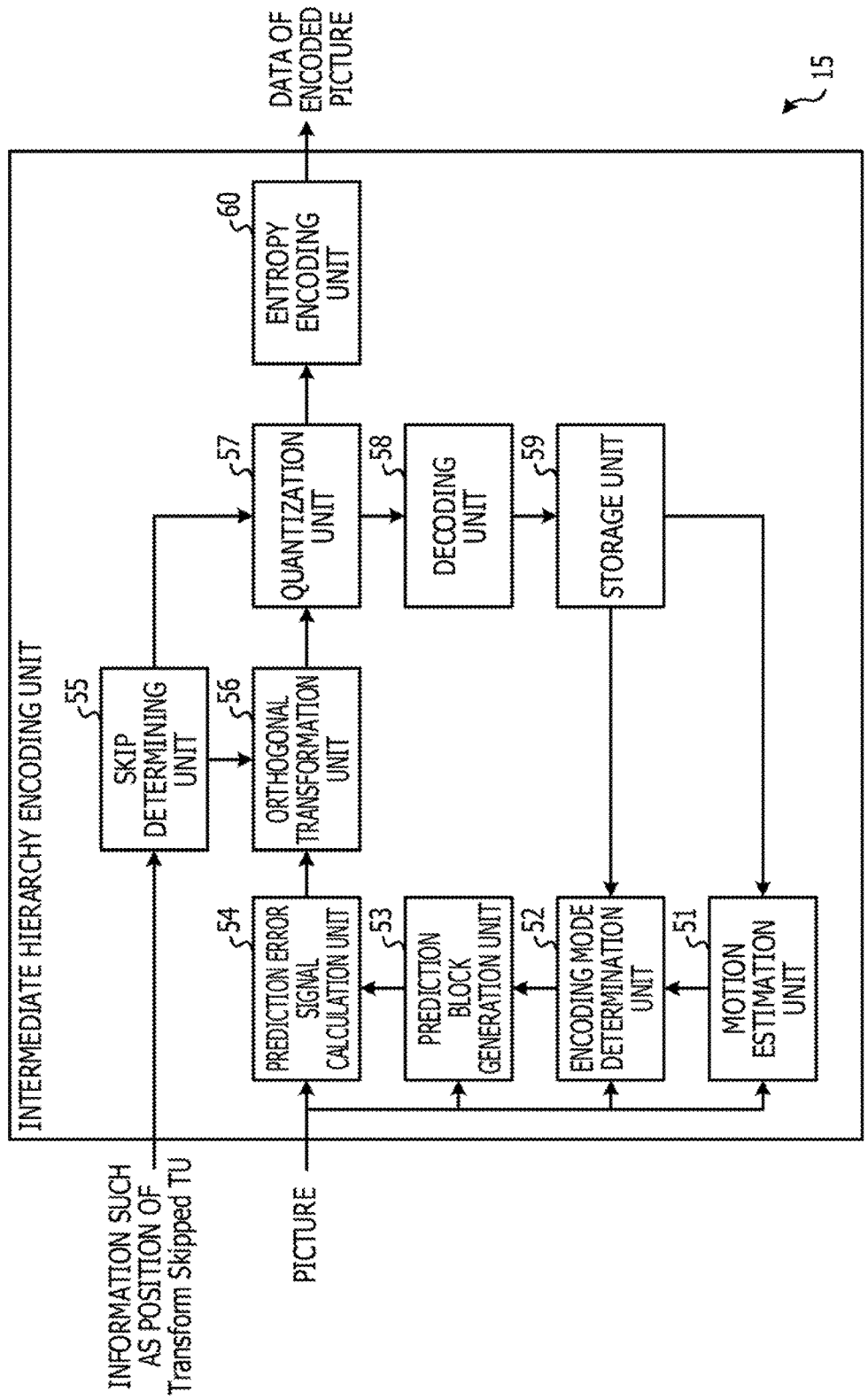
FIG. 9 is a schematic diagram of an intermediate hierarchy encoding unit.

FIG. 9 is a schematic diagram of the intermediate hierarchy encoding unit 15. The intermediate hierarchy encoding unit 15 includes a motion estimation unit 51, an encoding mode determination unit 52, a prediction block generation unit 53, a prediction error signal calculation unit 54, a skip determining unit 55, a orthogonal transformation unit 56, a quantization unit 57, a decoding unit 58, a storage unit 59, and an entropy encoding unit 60.

In a case where the picture to be encoded is the P picture or the B picture, the motion estimation unit 51 calculates the motion vector for each PU by executing the same process as that of the motion estimation unit 21 included in the lower hierarchy encoding unit 12. The motion estimation unit 51 also uses the local decoding picture, which is generated by the lower hierarchy encoding unit 12, corresponding to the encoding target picture as an example of the reference picture that is a target of the motion estimation.

The encoding mode determination unit 52, the prediction block generation unit 53, the prediction error signal calculation unit 54 execute the same process as that of the encoding mode determination unit 22, the prediction block generation unit 23, and the prediction error signal calculation unit 24 which are included in the lower hierarchy encoding unit 12, respectively. The encoding mode determination unit 52 determines the applying CU, PU, and TU dividing modes and the encoding mode such that the encoding cost becomes minimized. The encoding mode determination unit 52 also calculates the encoding cost in a case where the prediction block is generated from the local decoding picture which is obtained by the lower hierarchy encoding unit 12, that is, a case where the inter-hierarchy prediction encoding mode is applied. In addition, the encoding mode determination unit 52 may apply the CU, PU, and TU dividing modes to be used with respect to the same CTU in the lower hierarchy encoding unit 12, for the encoding target CUT, without any change. The prediction block generation unit 53 generates the prediction block according to the applying CU and PU dividing mode and the encoding mode for each CTU. The prediction error signal calculation unit 54 calculates the prediction error signal for each TU included in the CTU, for each CTU.

The skip determining unit 55 refers the information indicating a position and a range of the TU to which the Transform Skip is applied in the lower hierarchy encoding unit 12 stored in the buffer 11. The skip determining unit 55 determines that the Transform Skip is applied for the TU in which at least part of the TU is overlapped the TU to which the Transform Skip is applied. On the other hand, the skip determining unit 55 determines that the Transform Skip is not applied for the TU which is not overlapped the TU to which the Transform Skip is applied in the lower hierarchy encoding unit 12. Accordingly, the intermediate hierarchy encoding unit 15 can suppress that the error is diffused, for the TU in which least TU is partially overlapped the TU having a high localization degree of the pixel having the non-zero value in the lower hierarchy encoding unit 12.

The skip determining unit 55 directly outputs the prediction error signal to the quantization unit 57, for the TU to which the Transform Skip is applied. On the other hand, the skip determining unit 55 outputs the prediction error signal to the orthogonal transformation unit 56, for the TU to which the Transform Skip is not applied.

The orthogonal transformation unit 56 calculates the orthogonal by subjecting the prediction error signal to the orthogonal transformation for each TU to which the Transform Skip is not applied.

The quantization unit 57 quantizes the orthogonal transformation coefficient for each TU to which the Transform Skip is not applied. The quantization unit 57 directly quantizes the prediction error signal for each TU to which the Transform Skip is not applied. It is preferable that the quantization width to be used in the quantization process to be executed by the quantization unit 57 is less than the quantization width to be used in the quantization process to be executed by the quantization unit 28 of the lower hierarchy encoding unit 12. Therefore, the good image quality of the picture obtained by decoding the picture which is encoded by the intermediate hierarchy encoding unit 15 is obtained as compared to the image quality of the picture obtained by decoding the picture which is encoded by the lower hierarchy encoding unit 12.

The decoding unit 58 executes the same process as that of the decoding unit 29 included in the lower hierarchy encoding unit 12, decodes the each CTU, and obtains the local decoding block and the local decoding picture to save the obtained local decoding block and the local decoding picture to the storage unit 59. Furthermore, the decoding unit 58 saves the local decoding picture to the buffer 11.

The storage unit 59 saves the motion vector to be used in the local decoding block, the local decoding picture and the picture encoded in advance, or the like.

The entropy encoding unit 60 executes the same process as that of the entropy encoding unit 31 included in the lower hierarchy encoding unit 12 and subjects the quantized coefficient and motion vector of each TU to the entropy encoding. The entropy encoding unit 60 outputs the bit stream including the encoding data to the multiplexing unit 14.

The upper hierarchy encoding unit 13 executes the same process as that of the upper hierarchy encoding unit 13 according to the first embodiment and subjects each picture to the lossless coding. However, in the present embodiment, when applying the inter-hierarchy prediction encoding, the upper hierarchy encoding unit 13 uses the local decoding picture generated by the intermediate hierarchy encoding unit 15 as the reference picture. In addition, when applying the inter-hierarchy prediction encoding, the upper hierarchy encoding unit 13 may use the local decoding picture generated by the lower hierarchy encoding unit 12 as the reference picture.

The multiplexing unit 14 multiplexes the bit stream including the encoding data of the picture by each hierarchy.

According to the second embodiment, the intermediate hierarchy encoding unit applies the Transform Skip for the TU which is partially overlapped at least of the TU to which the Transform Skip is applied by the lower hierarchy encoding unit. Therefore, for the TU having the high localization degree of the pixel having the non-zero value in the lower hierarchy, the apparatus for encoding an apparatus for encoding a moving picture according to the second embodiment can suppress the diffusion of the error due to the orthogonal transformation and the quantization in the intermediate hierarchy. Therefore, the apparatus for encoding a moving picture can improve the encoding efficiency as a whole even in a case where the moving picture data is subjected to scalable encoding into the three levels of the hierarchy.

According to the modification example of the second embodiment, the apparatus for encoding a moving picture may include a plurality of intermediate hierarchy encoding units. Accordingly, even in a case where the moving picture data is subjected to the scalable encoding into 4 levels or more of the hierarchy, the encoding efficiency can be improved as a whole.

In addition, according to the other modification example, the lower hierarchy encoding unit 12 calculates the localization degree also for the TU having a size other than the 4×4 pixels. In a case where the localization degree is equal to or less than the predetermined threshold value, the lower hierarchy encoding unit 12 may apply the Transform Skip for the TU. In this case, the threshold value to be used for comparing the feature amount R indicating the localization degree by the skip determining unit 26 may be set as the great value as the size of the TU becomes increased. According to the modification example, in a case where the localization degree is high, the lower hierarchy encoding unit 12 can suppress that the error is diffused by the orthogonal transformation and the quantization also for the TU having a size greater than 4×4 pixels.

Furthermore, the block that is a generating unit of the prediction block may be set so as to being identical to the block that is a unit of the orthogonal transformation.

In addition, according to the other modification examples, the localization degree calculation unit 25 may calculate a feature amount R indicating the localization degree according to the flowing expression, for each TU having a possibility that the Transform Skip is applied.

$$R = \frac{SAD}{SAFTD} \quad (3)$$

Here, SAFTD represents a sum of the absolute values of frequency coefficients obtained by frequency transporting the prediction error signal. In this case, for all of the TUs, the orthogonal transformation unit 27 may perform the orthogonal transformation of the prediction error signal by DCT or DST. The localization degree calculation unit 25 may calculate the SAFTD by using a set of the DCT coefficients or a set of the DST coefficients calculated by the orthogonal transformation unit 27. Also in this case, the skip determining unit 26 may apply the Transform Skip for TU in which the localization degree is equal to or less than the predetermined threshold value (for example, 0.4).

Furthermore, according to the other modifications, the localization degree calculation unit 25 counts the number of pixels in which the pixel value is changed by direct quantization of the prediction error signal and then dequantization, for each TU (hereinafter, for convenience, referred to as a first number of changed pixel). In addition, the localization degree calculation unit 25 counts the number of pixels in which the pixel value is changed by orthogonal transformation and the quantization of the prediction error signal and then the dequantization and the inverse orthogonal transformation, for each TU (hereinafter, for convenience, referred to as a second number of changed pixel). In this case, the number of pixels in which an error occurs due to the orthogonal transformation and the quantization increases as the number of the second number of the changed pixel is more than that of the first number of the changed pixel. The localization degree calculation unit 25 may calculate the difference between the first number of the changed pixel and the second number of the changed pixel or the ratio of the second number of the changed pixel to the first number of the changed pixel as the localization degree.

Also in this case, the skip determining unit 26 may apply the Transform Skip for TU in which the localization degree is equal to or less than the threshold value. For example, in a case where the localization degree is calculated as a difference obtained by subtracting the second number of changed pixels from the first number of changed pixels, the predetermined threshold value is set to 0, for example. In addition, in a case the localization degree is calculated as a ratio of the second number of changed pixel to the first number of changed pixel, the predetermined threshold value is set to 1, for example.

According to the application example, the skip determining unit 26 determines whether the Transform Skip is applied after practically comparing the number of the pixel in which the error does occurs when the Transform Skip is applied and the number of the pixel in which the error occurs when the Transform Skip is not applied. Therefore, the skip determining unit 26 more appropriately determines the TU to which the Transform Skip is applied. As a result, the apparatus for encoding a moving picture 1 can improve the encoding efficiency by the upper hierarchy encoding unit 13.

Figure 10:
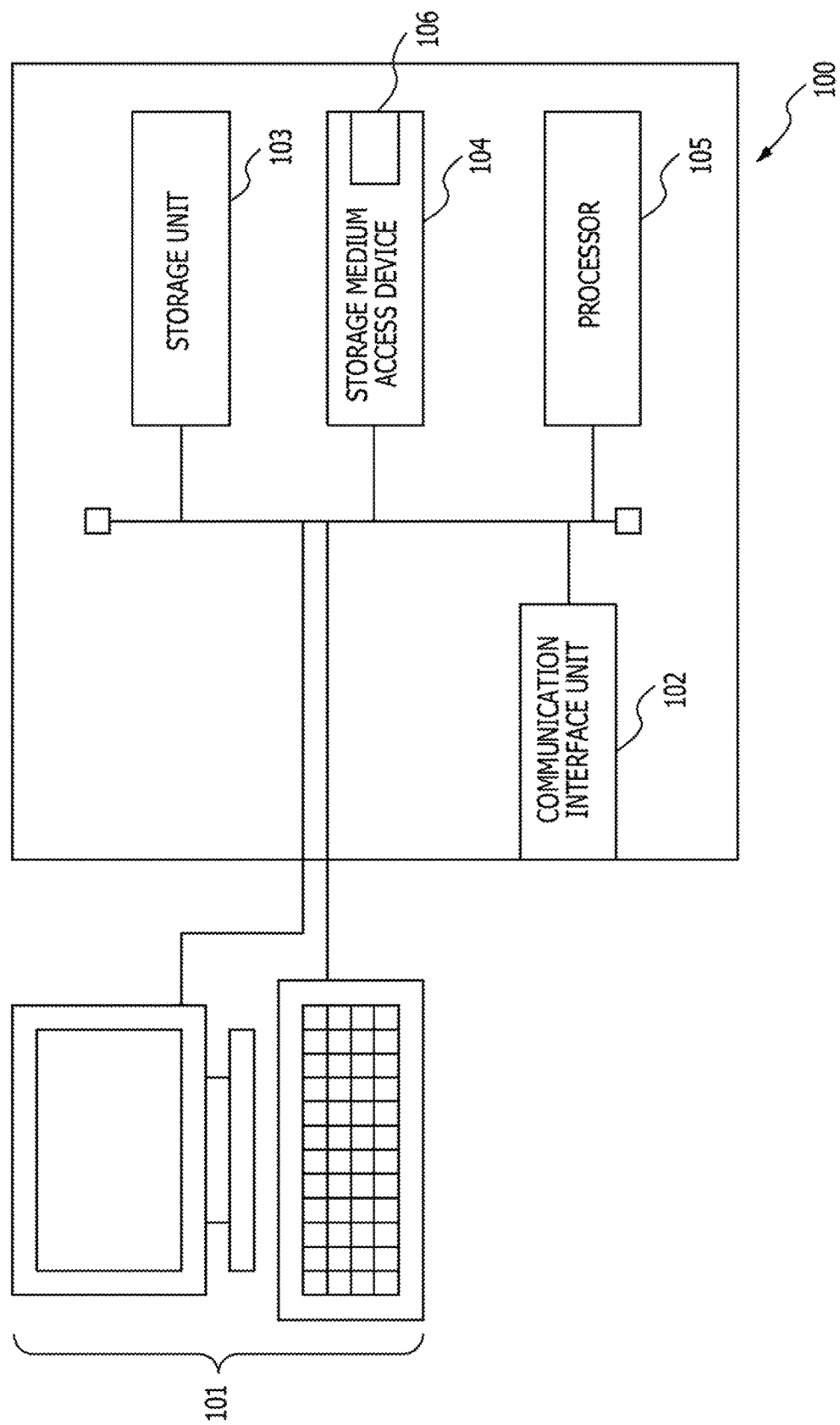
FIG. 10 is a configuration diagram of a computer for operating as the apparatus for encoding a moving picture according to any one of each of the above-described embodiment or a modification example.

FIG. 10 is a configuration diagram of a computer operated as an apparatus for decoding moving picture or an apparatus for decoding a moving picture by operating of a computer program for implementing the functionality of the various units of the apparatus for encoding moving picture or the or the apparatus for decoding a moving picture according to each embodiment or the modification example thereof. The computer can be used in, for example, above-described the monitoring system or the image analyzing system.

A computer 100 includes a user interface unit 101, a communication interface unit 102, a storage unit 103, a storage medium access device 104, and a processor 105. The processor 105 is connected to the user interface unit 101, the communication interface unit 102, the storage unit 103, and the storage medium access device 104 through a bus for example.

The user interface unit 101 includes, for example, an input device such as a key board, a mouse, or the like and a display device such as a liquid display. Alternatively, the user interface unit 101 may include a device in which the input device and the display device are integrally formed, such as a touch panel display. For example, the user interface unit 101 outputs the operation signal for selecting the encoding a moving picture data to the processor 105 according to the operation of the user.

The communication interface unit 102 may include a communication interface for connecting the computer 100 to a device for generating the moving picture data, for example, a video camera and a control circuit thereof. For example, such a communication interface can adopt a universal serial bus (USB) or a high-definition multimedia interface (HDMI) (registered trademark).

Furthermore, the communication interface unit 102 may include the communication interface for connecting to a communication network according to the communication standard such as the Ethernet (registered trademark) and the control circuit thereof.

In this case, the communication interface unit 102 acquires the encoding a moving picture data from the other equipments connected to the communication network and transmits the data to the processor 105. In addition, the communication interface unit 102 may output the encoding a moving picture data received from the processor 105 to the other equipments through the communication network.

For example, the storage unit 103 includes a readable semiconductor memory and a read only semiconductor memory. The storage unit 103 is executed on the processor 105 and stores a computer program for executing the moving picture encoding process and data generated in middle of the process or generated as a result of the process.

For example, the storage medium access device 104 is a device that accesses a storage medium 106 such as a magnetic disk, a semiconductor memory card, and an optical storage medium. For example, the storage medium access device 104 reads the computer program for moving picture encoding processing to be executed on the processor 105 stored in the storage medium 106 and transmits the reading result to the processor 105.

The processor 105 includes, for example, at least one of a central processing unit (CPU), a graphics processing unit (GPU) and a numeric data processor. The processor 105 executes a computer program for moving picture encoding processing by each of the above-described embodiments or the modification example to generate the bit stream including the moving picture data subjected to scalable encoding. The processor 105 saves the generated bit stream to the storage unit 103 and outputs the generated bit stream to the other equipments through the communication interface unit 102.

A computer program for moving picture encoding processing according to the above-described embodiments or the modification example may be provided in the form recorded on a computer readable recording medium. The term "recording medium" here does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for encoding a moving picture by an inter-layer prediction coding, the apparatus comprising:
  a memory; and
  a processor coupled to the memory and configured to:
    execute a first encoding process for a first layer in the moving picture, the first encoding process including
      generating a prediction block for a first block, the first block being a part of a picture included in moving picture data, both of the prediction block and the first block having one or more of pixels,
      calculating a prediction error signal between the prediction block and the first block,
      calculating a feature amount indicating a localization degree level of a pixel having a non-zero value in the prediction error signal, for a first sub-block which is a part of the first block and is used for a unit of orthogonal transformation,
      determining whether the orthogonal transformation is executed for the first sub-block in the first block, based at least in part on the feature amount,
      generating a first local decoding picture by decoding the first sub-block based at least in part on a quantized coefficient which is obtained by quantizing either one of an orthogonal transformation coefficient or the prediction error signal in accordance with a result of the determining, the orthogonal transformation coefficient being obtained by applying the orthogonal transformation to the prediction error signal, and
      performing entropy encoding of the quantized coefficient to output a first encoded bit stream; and
    execute a second encoding process for a second layer other than the first layer in the moving picture, the second encoding process including
      generating a second prediction block for a second block based at least in part on any of the first local decoding picture, another picture encoded before the picture included in moving picture data, and another block encoded before the second block, the second block being a part of the picture, the second block being a part of the picture included in moving picture data, both of the second prediction block and the second block having one or more of pixels, and
      performing the entropy encoding of the prediction error signal between the second prediction block and the second block to output a second encoded bit stream.

2. The apparatus according to claim 1,
wherein the first encoding process, further includes:
calculating the orthogonal transformation coefficient by applying the orthogonal transformation to the prediction error signal of the first sub-block for which the result of the determining is that the orthogonal transformation is executed; and
a process for quantizing the orthogonal transformation coefficient of the first sub-blocks to output the quantized coefficient, in a case where the result of the determining is that the orthogonal transformation is executed for the first sub-block, and
quantizing the prediction error signal of the first sub-block to output the quantized coefficient, in a case where the result of the determining is that the orthogonal transformation is not executed for the first sub-block.

3. The apparatus according to claim 1,
wherein the calculating the feature amount includes
calculating a ratio of a sum of absolute values of the prediction error signal with respect to a sum of absolute values of the Hadamard coefficient which is obtained such that the prediction error signal in the first sub-block is subjected to the Hadamard transformation, as the feature amount.

4. The apparatus according to claim 1,
wherein the calculating the feature amount includes
calculating a ratio of the sum of the absolute values of the prediction error signal with respect to the sum of the absolute values of the number of frequencies which is obtained such that the prediction error signal in the first sub-block is subjected to frequency transformation, as the feature amount.

5. The apparatus according to claim 3,
wherein the determining whether the orthogonal transformation is executed based on the feature amount includes
determining that the orthogonal transformation is not executed, in a case where the ratio of the absolute values is equal to or less than a given threshold value.

6. The apparatus according to claim 1,
wherein the calculating the feature amount includes
calculating a difference or a ratio between a first number indicative of the number of pixels having a non-zero value included in the prediction error signal in the first sub-block and a second number indicative of the number of coefficients having the non-zero value included in the orthogonal transformation coefficient obtained by applying the orthogonal transformation to the prediction error signal in the first sub-block.

7. The apparatus according to claim 6,
wherein the determining whether the orthogonal transformation is executed based at least in part on the feature amount includes
determining that the orthogonal transformation is not executed, in a case where the feature amount of the second number is greater than that of the first number.

8. The apparatus according to claim 1,
wherein the processor is further configured to execute a third encoding process for a third layer other than both of the first layer and the second layer in the moving picture, the third encoding process including
dividing the picture into a plurality of third block,
generating a third prediction block for a third block based at least in part on any of the first local decoding picture, the another picture encoded before the picture, and the another third block encoded before the third block, the third block being a part of the picture, both of the third prediction block and the third block having one or more of pixels,
performing the entropy encoding a quantized coefficient which is obtained by quantizing at least either one of a third prediction error signal or a third orthogonal transformation coefficient, the third orthogonal transformation coefficient being obtained by applying the orthogonal transformation to the third prediction error signal obtained by performing a difference operation between the third prediction block and the third block, and
generating a second local decoding picture by decoding the third block based at least in part on a third quantized coefficient which is obtained by quantizing either one of the third prediction error signal or the third orthogonal transformation coefficient,
wherein the second encoding process includes
generating the prediction block based at least in part on any of the first local decoding picture, the second local decoding picture, the another picture encoded before the picture, and the another second block encoded before the second block, and
wherein the third encoding process further includes
calculating the third quantized coefficient by quantizing the third prediction error signal of the third sub-block, the third sub-block being at least in part overlapped with the first sub-block in which the orthogonal transformation is not executed in the first encoding process.

9. The apparatus according to claim 1,
wherein the process for generating the first local decoding picture includes
applying a dequantization to the quantized coefficient which is obtained by quantizing the prediction error signal of the first sub-block to reconstruct the prediction error signal of the first sub-block, in a case where the result of the determining is that the orthogonal transformation is not executed for the first sub-block, and
applying a dequantization to the quantized coefficient which is obtained by quantizing the orthogonal transformation coefficient of the first sub-block to reconstruct the orthogonal transformation coefficient of the first sub-block, in a case where the result of the determining is that the orthogonal transformation is executed for the first sub-block,
applying the inverse orthogonal transformation to the orthogonal transformation coefficient reconstructed from the quantized coefficient to reconstruct the prediction error signal of the first sub-block, in a case where the result of the determining is that the orthogonal transformation is executed for the first sub-block,
adding the prediction error signal reconstructed from either one of the quantized coefficient or the orthogonal transformation coefficient to the prediction block corresponding to the first sub-block, to generate a first local decoding block, and
combining one or more of the first local decoding blocks for one picture to generate the first local decoding picture.

10. A method for encoding a moving picture by an inter-layer prediction coding, the method comprising:
executing, by a processor, a first encoding process for a first layer in the moving picture, the first encoding process including
generating a prediction block for a first block, the first block being a part of a picture included in moving picture data, both of the prediction block and the first block having one or more of pixels,
calculating a prediction error signal between the prediction block and the first block,
calculating a feature amount indicating a localization degree level of a pixel having a non-zero value in the prediction error signal, for a first sub-block which is a part of the first block and is used for a unit of orthogonal transformation,
determining whether the orthogonal transformation is executed for the first sub-block in the first block, based at least in part on the feature amount,
generating a first local decoding picture by decoding the first sub-block based at least in part on a quantized coefficient which is obtained by quantizing either one of an orthogonal transformation coefficient or the prediction error signal in accordance with a result of the determining, the orthogonal transformation coefficient being obtained by applying the orthogonal transformation to the prediction error signal, and
performing entropy encoding of the quantized coefficient to output a first encoded bit stream; and
executing, by the processor, a second encoding process for a second layer other than the first layer in the moving picture, the second encoding process including
generating a second prediction block for a second block based at least in part on any of the first local decoding picture, another picture encoded before the picture included in moving picture data, and another block encoded before the second block, the second block being a part of the picture, the second block being a part of the picture included in moving picture data, both of the second prediction block and the second block having one or more of pixels, and performing the entropy encoding of the prediction error signal between the second prediction block and the second block to output a second encoded bit stream.

11. A non-transitory computer-readable medium for storing computer-executable program that cause a processor to execute a process for encoding a moving picture by an inter-layer prediction coding, the process comprising:

executing a first encoding process for a first layer in the moving picture, the first encoding process including generating a prediction block for a first block, the first block being a part of a picture included in moving picture data, both of the prediction block and the first block having one or more of pixels, calculating a prediction error signal between the prediction block and the first block, calculating a feature amount indicating a localization degree level of a pixel having a non-zero value in the prediction error signal, for a first sub-block which is a part of the first block and is used for a unit of orthogonal transformation, determining whether the orthogonal transformation is executed for the first sub-block in the first block, based at least in part on the feature amount, generating a first local decoding picture by decoding the first sub-block based at least in part on a quantized coefficient which is obtained by quantizing either one of an orthogonal transformation coefficient or the prediction error signal in accordance with a result of the determining, the orthogonal transformation coefficient being obtained by applying the orthogonal transformation to the prediction error signal, and performing entropy encoding of the quantized coefficient to output a first encoded bit stream; and executing a second encoding process for a second layer other than the first layer in the moving picture, the second encoding process including generating a second prediction block for a second block based at least in part on any of the first local decoding picture, another picture encoded before the picture included in moving picture data, and another block encoded before the second block, the second block being a part of the picture, the second block being a part of the picture included in moving picture data, both of the second prediction block and the second block having one or more of pixels, and performing the entropy encoding of the prediction error signal between the second prediction block and the second block to output a second encoded bit stream.

* * * * *